(12) United States Patent
Relihan et al.

(10) Patent No.: US 10,870,430 B2
(45) Date of Patent: Dec. 22, 2020

(54) COMMUNICATING THE AUTONOMY STATUS OF VEHICLES

(71) Applicant: INTEL CORPORATION, Santa Clara, CA (US)

(72) Inventors: David Relihan, Multyfarnham (IE); Michael O'Reilly, Dunshaughlin (IE)

(73) Assignee: Intel Corporation, Santa Clara, CA (US)

( * ) Notice: Subject to any disclaimer, the term of this patent is extended or adjusted under 35 U.S.C. 154(b) by 390 days.

(21) Appl. No.: 15/866,625

(22) Filed: Jan. 10, 2018

(65) Prior Publication Data

US 2019/0047558 A1 Feb. 14, 2019

(51) Int. Cl.

| | |
|---|---|
| *B60W 30/095* | (2012.01) |
| *G08G 1/0967* | (2006.01) |
| *G08G 1/01* | (2006.01) |
| *B60Q 1/26* | (2006.01) |
| *G05D 1/02* | (2020.01) |
| *B60W 40/09* | (2012.01) |
| *G05D 1/00* | (2006.01) |
| *H04W 84/00* | (2009.01) |
| *H04W 84/18* | (2009.01) |
| *G08C 23/04* | (2006.01) |

(52) U.S. Cl.
CPC .......... *B60W 30/0956* (2013.01); *B60Q 1/26* (2013.01); *B60W 40/09* (2013.01); *G05D 1/0088* (2013.01); *G05D 1/0214* (2013.01); *G08G 1/0133* (2013.01); *G08G 1/09675* (2013.01); *G08G 1/096725* (2013.01); *G08G 1/096791* (2013.01); *B60W 2530/00* (2013.01); *B60W 2554/00* (2020.02); *G08C 23/04* (2013.01); *H04W 84/005* (2013.01); *H04W 84/18* (2013.01)

(58) Field of Classification Search
CPC ............ B60W 30/0956; B60W 40/09; B60W 2554/00; B60W 2530/00; G08G 1/09675; G08G 1/096725; G08G 1/0133; G08G 1/096791; G05D 1/0088; G05D 1/0214; B60Q 1/26; G08C 23/04; H04W 84/18; H04W 84/005
See application file for complete search history.

(56) References Cited

U.S. PATENT DOCUMENTS

| | | | |
|---|---|---|---|
| 9,658,620 B1 * | 5/2017 | Urmson | ............ B60T 8/17 |
| 2015/0078741 A1 * | 3/2015 | O'Connor | .......... H04B 10/69 398/23 |
| 2016/0247394 A1 * | 8/2016 | Stenneth | ............. G07C 5/008 |

\* cited by examiner

*Primary Examiner* — Thomas G Black
*Assistant Examiner* — Ana D Thomas
(74) *Attorney, Agent, or Firm* — Schiff Hardin LLP (57) ABSTRACT

In one example, an autonomy system assigns a trust level to a vehicle, wherein the trust level is a lowest trust level. The autonomy system may modify the trust level to fully autonomous in response to an indicator light providing a fully autonomous status prior to a maneuver as indicated by the indicator light. Additionally, the autonomy system may modify the trust level to driver controlled in response to the indicator light providing a driver controlled status prior to the maneuver as indicated by the indicator light.

24 Claims, 10 Drawing Sheets

COMMUNICATING THE AUTONOMY STATUS OF VEHICLES

TECHNICAL FIELD

This disclosure relates generally to communicating the autonomy status of vehicles.

BACKGROUND

Roadways allow vehicles to move about in a coordinated fashion. Often, these vehicles have varying levels of autonomy. Some vehicles may be fully autonomous, while others are semi-autonomous with differing levels of driver intervention. Indeed, some vehicles may be completely driver controlled.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. In some cases, numbers in the 100 series refer to features originally found in FIG. 1; numbers in the 200 series refer to features originally found in FIG. 2; and so on.

DESCRIPTION OF THE EMBODIMENTS

As discussed above, some vehicles may be fully autonomous, while others are semi-autonomous with differing levels of driver intervention. Generally, an autonomous vehicle is one that is able to sense and monitor the surrounding environment, and navigate the surrounding environment without human input or intervention. There are often a mixture of vehicles with varying levels of autonomy on any given roadway. For example, there may will be a mixture of Level 0-5 vehicles sharing the road at one time. So although some vehicles may be fully autonomous (Level 4 and 5), many more will still have some level of driver intervention (Levels 1-3) or be completely driver controlled (Level 0). In this mixed vehicle environment, autonomous vehicles cannot determine whether the vehicles that surround it are human controlled or under autonomous control.

This mixed vehicle environment combined with a lack of information regarding the autonomy status of each vehicle may present a challenge in terms of trusting any indicated vehicle direction changes. For example, human drivers often use signal or indicator lights to communicate to other drivers an intention to complete a lane change, turn maneuver, or other direction change. A human driver may fail to complete the indicated lane change, turn maneuver, or other direction change, even when there is an indication that such a maneuver will occur. These failures result in inefficiencies in autonomous vehicle navigation, as autonomous systems must be aware of the possibility that a signaled maneuver may not be completed. In particular, an autonomous system may wait until the possibility of a lane change, turn maneuver, or other direction change has passed before completing its own tasks.

Embodiments described herein enable communication of the autonomy status of vehicles. In embodiments, the autonomy status is communicated immediately prior to an indicated lane change, turn maneuver, or other direction change via visible light communication (VLC). The VLC can be sent via any light output of a vehicle. In embodiments, the present techniques enable vehicles to communicate to other vehicles via indicator lights activated by a vehicle under autonomous control or by a driver controlled car. Autonomous vehicles that detect the VLC from the indicator lights will be able to assign a trust-level based on the received VLC.

In embodiments, all vehicles in a field of vision (FOV) of a current vehicle will be assigned an initial low trust level. Prior to an indicated maneuver such as a lane change, turn maneuver, or other direction change, a vehicle within the FOV of the current vehicle will communicate both that it is about to perform a maneuver and its autonomy status via VLC from the signal or indicator light. The current vehicle can make faster, more efficient and complex decisions based on the communicated autonomy status compared to decisions made with no autonomy status information from vehicles within the FOV. For a fully autonomous vehicle, the current vehicle can safely assume that the maneuver will be completed as indicated.

Figure 1:
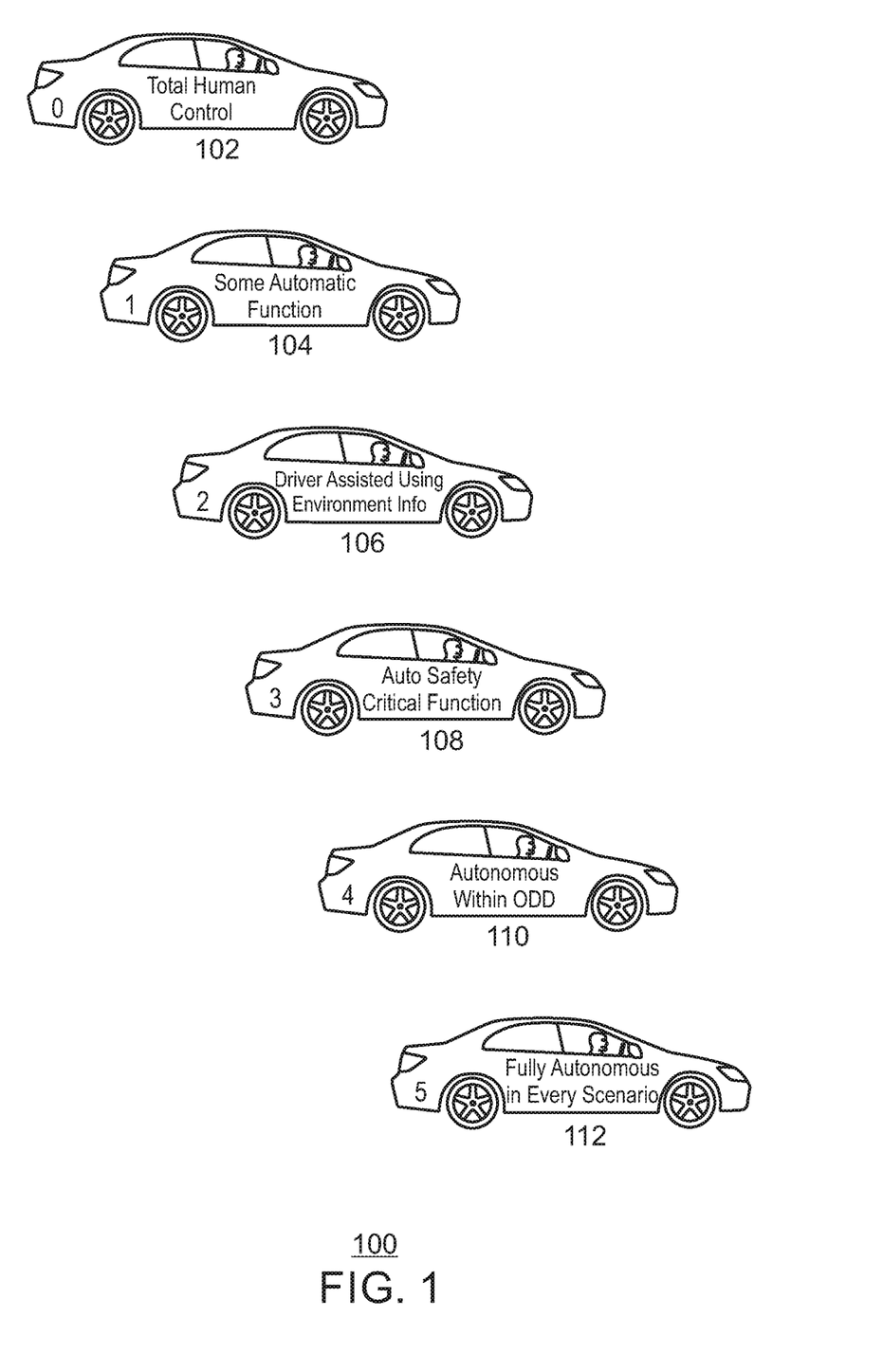
FIG. 1 is an illustration of autonomy levels of autonomous vehicle systems.

FIG. 1 is an illustration of autonomy levels of autonomous vehicle systems. Autonomous vehicle systems may control lane changes, parking, braking, and so on of a vehicle. The United States Department of Transportation's National Highway Traffic Safety Administration (NHTSA) has defined six different levels of autonomous driving. The levels are numbered zero though five. While particular autonomy levels are described here, any system of autonomy levels may be used. Moreover, as particular autonomy levels are refined with respect to differing capabilities and distinctions between levels, the corresponding trust levels may also be refined to reflect a one-to-one correspondence with the autonomy levels.

A level zero driving system 102 is one that is under total human control. The human driver is responsible for all vehicle functionality, including but not limited to power, braking, steering, and throttling. In embodiments, a level zero driving system may be a conventional driving system. A level one driving system 104 is one that has some automatic functions. Here, a specific small element of driving can be done automatically by the vehicle. Small elements may refer to a particular task such as braking, steering, or accelerating.

A level two driving system 106 is one that has automatic functions that are based on information from the driving environment. In embodiments, the level two driving system 106 includes at least two automated functions. The automated functions may be, for example, steering and acceleration/deceleration using information obtained from the driving environment. Further, a level two driving system 106 may mean that the driver disengages from physically operating the vehicle by leaving two functions to purely vehicle control. For example, in a level two driving system 106 the driver may be disengaged from physically operating the vehicle by having his or her hands off the steering wheel and having the foot off of the pedal at the same time.

A level three driving system 108 is one that shifts safety critical functions to the automated driving system under particular conditions. Accordingly, while a driver is present, the driver is not required to monitor the environment around them as much as when compared to the level zero driving system 102, level one driving system 104, and the level three driving system 106.

A level four driving system 110 is considered fully autonomous. The level four automated system is designed to perform all safety critical driving functions and monitor roadway conditions for an entire trip. However, the level four driving system 110 is limited to scenarios within an operational design domain (ODD) of the vehicle. Thus, the level four driving system 110 is not capable of autonomous driving in every scenario. A level five driving system 112 is fully autonomous in every driving scenario. In embodiments, a level five driving system may be without a steering wheel or other general components that enable human control of the level five driving system.

In embodiments, the present techniques make an initial assumption that all vehicles are under human control and are therefore untrustworthy. Thus, any new vehicle in the FOV of a current vehicle is automatically assigned to a lowest trust level. The trust level may be modified as vehicles within the FOV of the current vehicle communicate their autonomy status via VLC. In embodiments, existing lights on vehicles can be used to communicate a trust level based at least in part on the autonomous driving level of the vehicle. In embodiments, the trust level may be communicated by an indicator light during any maneuver that causes a lane or direction change, such as a turning maneuver or a lane change maneuver. In both instances, a vehicle should have an indicator light activated (either manually by a human or autonomously) prior to the start of the maneuver. Within the visible flashing of the indicator light, VLC during the on portion of the visible flashing can communicate a trust-level that indicates the autonomy status of the vehicle. From the trust level, the current vehicle can deduce whether maneuver is intentionally indicated, accidentally indicated, or if there is a change the maneuver may not be completed. The trust levels can be used to enable various efficiencies at places where these maneuvers generally take place, such as intersections and roundabouts. In some cases, a human controlled car may fail to properly signal for a maneuver. In such a case, the present techniques can use any other light of the car to communicate the human controlled status of the car.

Figure 2A:
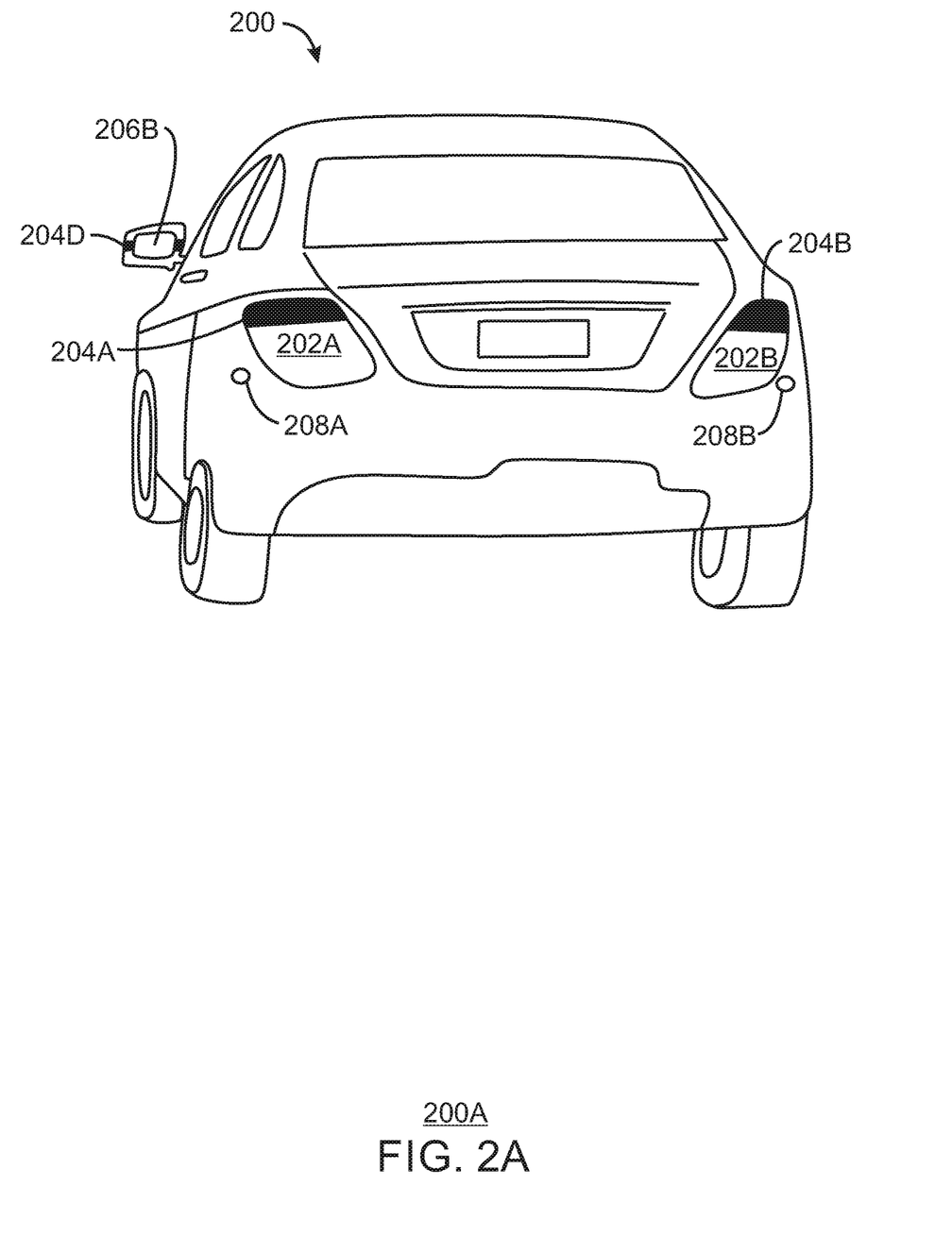
FIG. 2A is a rear view of a car.

FIG. 2A is a rear view 200A of a car 200. Generally, vehicles have a plurality of lights that are used to provide illumination so that a human driver can clearly see the surrounding environment. The plurality of lights may also communicate to other drivers future maneuvers of the vehicle. For example, brake lights 202A and 202B may indicate when the vehicle 200 is slowing down when they are illuminated. Signal or indicator lights 204A, 204B, and 204D may indicate when the vehicle is to begin a maneuver to change directions. A side view mirror 206B may also include the indicator light 204D, which is partially occluded by the side view mirror 206B. The car 200 may also include hazard lights 208A and 208B.

In examples, the signal or indicator lights 204A, 204B, and 204D of vehicle 200 may indicate that the vehicle is preparing to change lanes or turn, depending on a context of the signal or indicator light 204A, 204B, and 204D. For example, if the indicator lights 204A and 204D are actively flashing, that may indicate to other drivers that the car 200 is going to turn left, enter the left lane, or some other maneuver to the left. A context can provide additional information to accurately predict the particular maneuver. For example, if the indicator lights 204A and 204D are actively flashing and the car 200 is in a left turning lane, the context of the car being in the left turning lane may indicate that the car 200 is going to turn left. If, for example, the context is the vehicle 200 traveling on a multi-lane road with no braking as the indicator lights 204A and 204D illuminate, a prediction may be that the vehicle 200 is to enter the left lane of the roadway. As used herein, the context of the indicator lights refers to additional information that is used to predict the particular maneuver that is indicated via indicator light illumination.

Figure 2B:
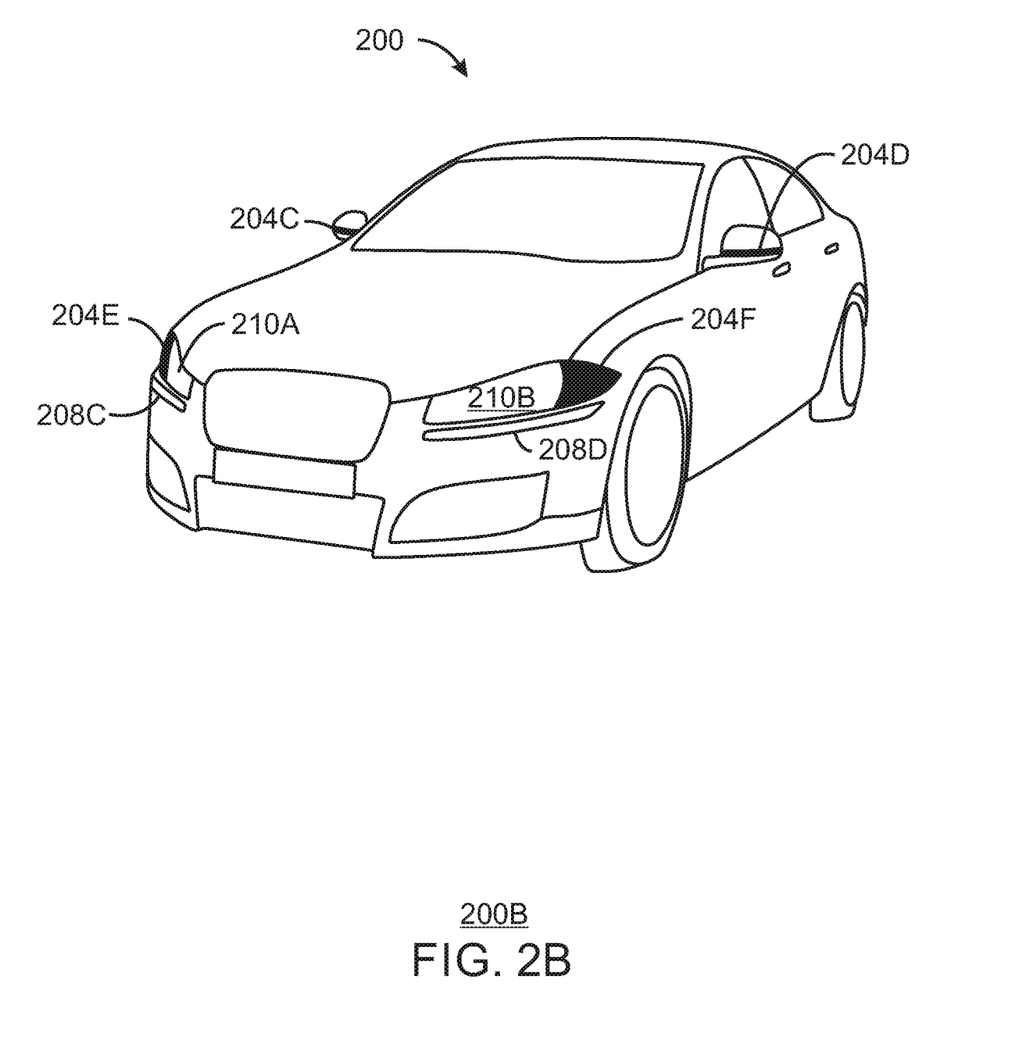
FIG. 2B is a front view of the car.

FIG. 2B is a front view 200B of the car 200. In the front view, full views of the indicator lights 204C and 204D are visible. The car 200 further includes indicator lights 204E and 204F located near head lights 210A and 210B. The front view 200B of the car 200 also includes hazard lights 208C and 208D. As described above, indicator lights 204C, 204D, 204E, and 204F may be used to indicate a potential maneuver of the car 200. Combined with a context, the particular maneuver may be predicted.

The indicator lights typically flash or blink on and off at a rate that is visible to humans when indicating a potential maneuver. The present techniques enable communication of an autonomy status via the indicator light. In particular, when the indicator light is ON during a flashing or blinking sequence, visible light communication (VLC) enables communication of the autonomy status. Thus, vehicles may communicate if the indicator lights were activated by an autonomous vehicle system or by a driver controlling the car manually. In this manner, autonomous vehicles that detect a turn signal will be able to exercise caution if the signal was activated by the driver. Moreover, an autonomous vehicle may combine the communicated autonomy status with a context to enable faster, more efficient autonomous vehicle navigation decisions.

In embodiments, the present techniques may communicate the autonomy status via existing indicator lights. In examples, a single bit of information is communicated to other vehicles. A bit value 1 may indicate that the car is under autonomous control, and a bit value 0 may indicate that the vehicle is under manual control. In embodiments, pulse width modulation (PWM) may be used to encode the binary data onto the flashing indicator light while the light visibly ON. Put another way, while the light flashing is visibly ON, PWM may be applied to the ON light to represent a binary bit value. The PWM to represent the binary bit value may not be visible to humans. In some cases, a pulse that lasts for X nanoseconds may correspond to a bit value of 1, and a pulse that lasts for Y nanoseconds will correspond to a bit value of 0. A pulse during PWM describes the light being driven high. In embodiments, the PWM applied to the indicator flashing ON/OFF is the ON portion is altered slightly to be able to communicate this binary data to other vehicles.

The autonomous vehicles will be able to use their existing visual detection systems to decode the modulating light into its corresponding binary bit value. The autonomous vehicles can then take action based on the status received. If it is detected that vehicle ahead is in manual mode, then the autonomous vehicle knows to wait until a maneuver is completed successfully before continuing. Vehicles that do not trust this method are ignored, and therefore untrusted. Accordingly, in embodiments vehicles that do not communicate their autonomy status remain at a lowest trust level.

Figure 3A:
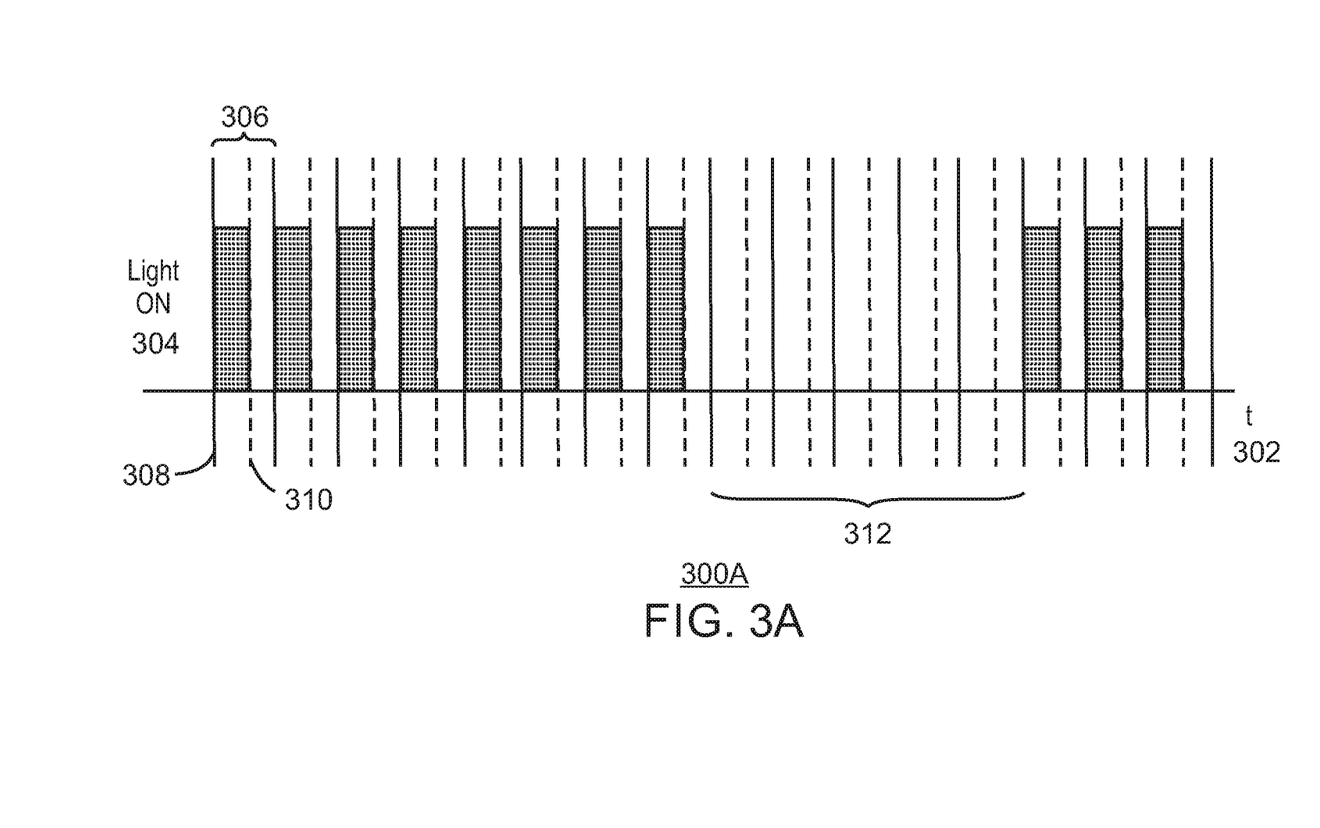
FIG. 3A is an illustration of visible light communication across bit time periods.

FIG. 3A is an illustration of visible light communication 300A across bit time periods 306. The bit time periods 306 occur along an x-axis that represents time t 302. The y-axis represents an on/off function 304 of a light. The visible light communication can be implemented through the on/off keying of a light. Across the bit time periods 306, a light on occurs for approximately half of the bit period, which may indicate a bit level 1. Each of the solid vertical lines 308 marks the beginning of the bit time period 306 where a bit of data can be transmitted using the light. Each of the dashed vertical lines 310 marks the middle of the time period 306 where a bit of data can be transmitted using the light. As illustrated in FIG. 3A, the light on occurs during the first half of each bit time period 306. During the second half of the bit time period 306, the light is off. During the time period 312, the light is complete off. This corresponds to when the blinking/flashing indicator light is visibly off. During the period 312, no data is communicated by the vehicle.

Figure 3B:
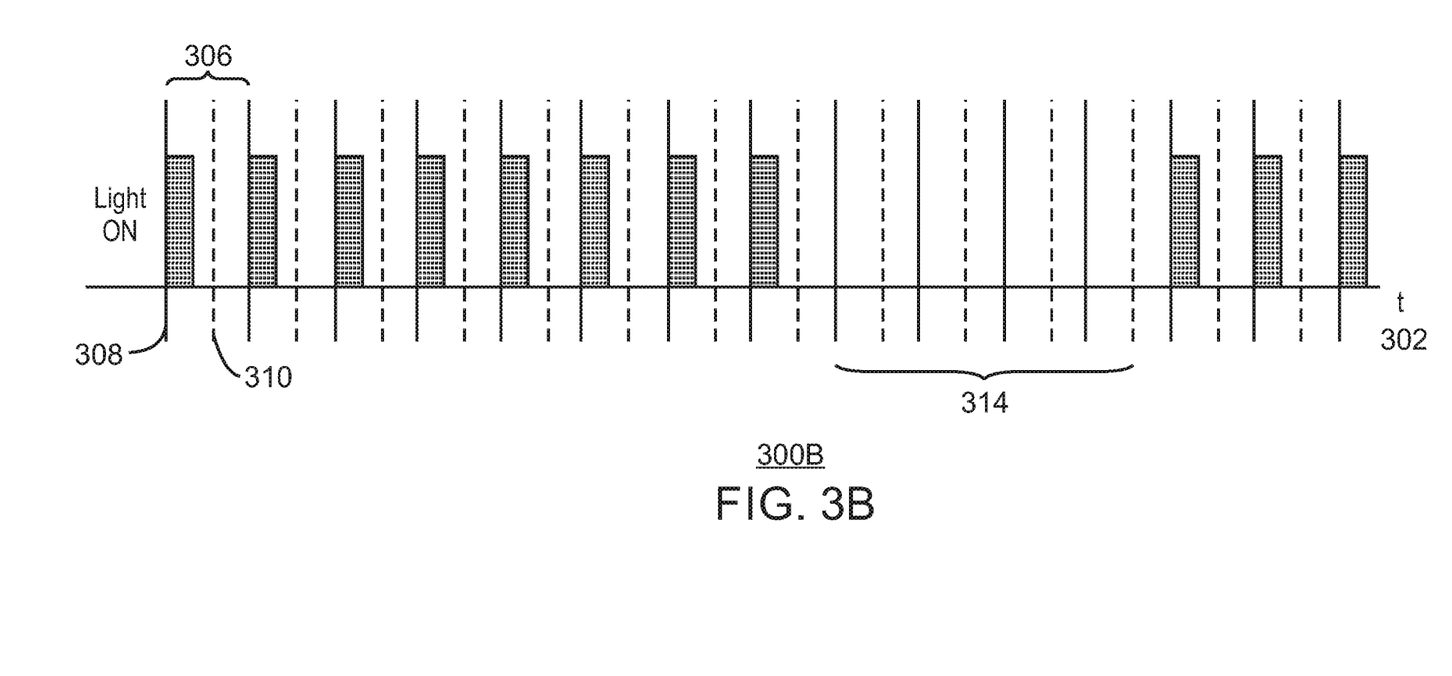
FIG. 3B is another illustration of visible light communication across bit time periods.

FIG. 3B is an illustration of visible light communication 300B across bit time periods 306. Similar to FIG. 3A, the bit time periods occur along an x-axis that represents time t 302. The y-axis represents an on/off function 304 of a light. In FIG. 3B, across the bit time periods 306, a light on occurs for approximately a quarter of the bit period, which may indicate a bit level 0. As illustrated in FIG. 3B, the light on occurs during the first quarter of each bit time period 306. During the remaining three quarters of the bit time period 306, the light is off. During the time period 314, the light is complete off. This corresponds to when the blinking/flashing indicator light is visibly off. During the period 314, no data is communicated by the vehicle.

In FIGS. 3A and 3B, the light on/off during each bit time period is invisible to the human eye, and may be superimposed on a blinking indicator light when a vehicle indicates a turning maneuver is imminent. During the light on portion of the visible blinking that indicates a maneuver, the light may communicate through VLC a particular bit level. The human eye can observe when the light is off across several bit time periods, such as time periods 312 and 314. In FIGS. 3A and 3B, each portion of the bit time where the light is on may be referred to as a pulse. During each bit time period, the pulse can be used to indicate the particular bit value sent. For example, the bit value may be a logic level one or a logic level zero, depending on the pulse during each bit time period. Pulse width modulation (PWM) can be used to alter with width of each pulse in order to encode data for transmission using the on-off keying of a light source. In embodiments, if a pulse occurs during the first half of the bit time (light on), then that is encoded as a logic one level. If the pulse occurs in the second half of a bit time then that is encoded as a logic level zero. The pulse width may be considered irrelevant in determining the logic level.

Communication of binary data during the ON portion of a flashing ON/OFF indicator light is described herein for exemplary purposes. Further, VLC may be used to communicate more than two autonomy statuses. In some cases, an encoding scheme may encode any number of bit values onto the indicator light. Additionally, in examples, vehicle lights other than the indicator lights may be used to communicate an autonomy status.

Figure 4A:
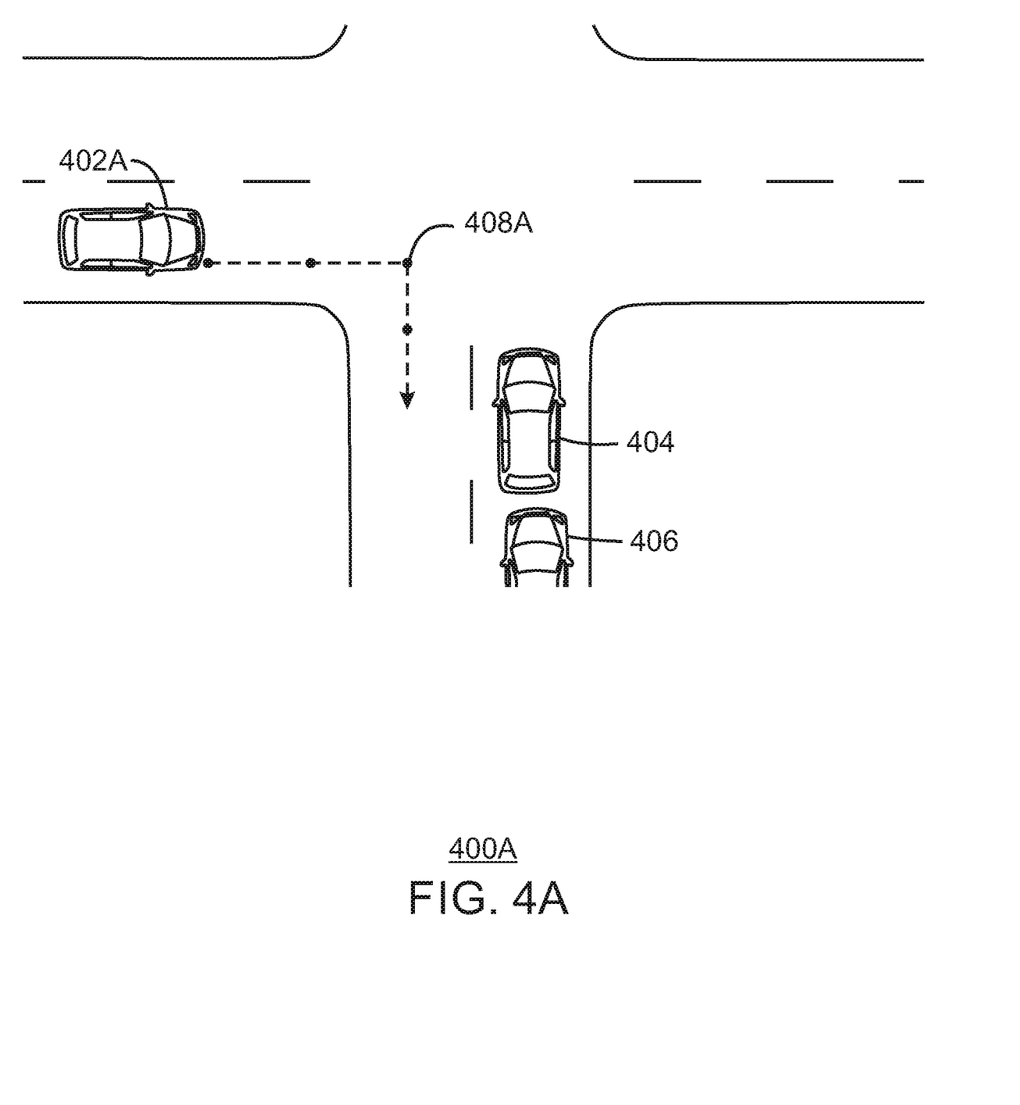
FIG. 4A is a top view of an intersection.

FIG. 4A is a top view of an intersection 400A. The car 402A is in a manual mode, car 404 is fully autonomous mode, and car 406 is in any mode. The car 404 may initially assign a low trust level to all cars in its FOV, including car 402A and 406. On approach to the intersection 400A, the car 402 is signaling for a maneuver to the right to be completed at the intersection 400A. The context of the car 402A is approaching an intersection where a right turn maneuver could be completed. Accordingly, from the FOV of the car 404, the car 402A may be indicating a right turn at the intersection 400A as indicated by the dashed right turn arrow 408A.

In the example of FIG. 4A, the car 402A is not in a fully autonomous mode. For example, the car 402A may be a level zero, one, two, or three driving system as described with respect to FIG. 1. Accordingly, a flashing indicator light of car 402A may communicate to the car 404 a low trust level, and the initial trust level assigned to the car 402A is not changed. The car 404 in an autonomous mode detects that the car 402A is signaling to turn right and has a low trust level. In embodiments, the indicator light of car 402A will execute VLC that will be decoded as a bit value 0. This bit value 0 may be communicated as described with respect to FIG. 3B. As a result of the car 404 assigning a low trust-level to the car 402A, the car 404 is limited in actions it can take until the potential right turn maneuver by the car 402A is complete. For example, if the car 404 is to proceed through the intersection 400A, it will wait until the car 402A either begins or completes the signaled right turn maneuver. By waiting for the car 402A to either begin or complete the signaled right turn maneuver, the car 404 avoids any potential collisions if the car 402A does not make a right turn and proceeds straight through the intersection.

Figure 4B:
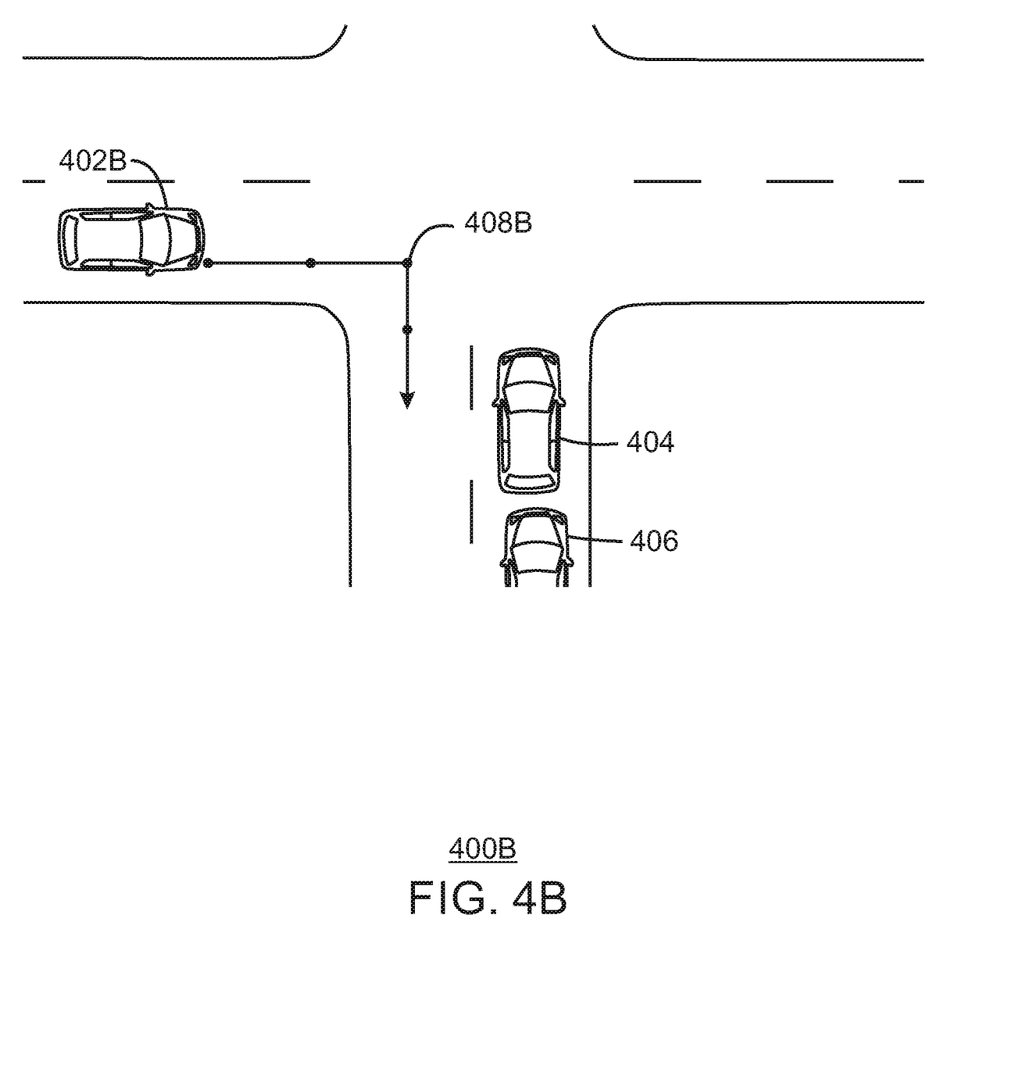
FIG. 4B is a top view of an intersection.

FIG. 4B is a top view of an intersection 400B. Similar to FIG. 4A, car 404 is in a fully autonomous mode and car 406 is in any mode. However, car 402B is in a fully autonomous mode. The car 404 may initially assign a low trust level to all cars in its FOV, including car 402B and 406. On approach to the intersection 400B, the car 402B is signaling for a maneuver to the right to be completed at the intersection 400B. The context of the car 402B is approaching an intersection where a right turn maneuver could be completed. Accordingly, from the FOV of the car 404, the car 402B may be indicating a right turn at the intersection 400A as indicated by the solid right turn arrow 408B.

In the example of FIG. 4B, the car 402B is in a fully autonomous mode. For example, the car 402B may be a level four or five driving system as described with respect to FIG. 1. Accordingly, a flashing indicator light of car 402B may communicate to the car 404 a high trust level, and the initial trust level assigned to the car 402B may be changed based on the communicated trust level. The car 404 in an autonomous mode detects that the car 402B is signaling to turn right and has a high trust level. In embodiments, the indicator light of car 402B will execute VLC that will be decoded as a bit value 1. This bit value 1 may be communicated as described with respect to FIG. 3A. As a result of the car 404 assigning a high trust-level to the car 402B, the car 404 can proceed with actions prior to the beginning or completion of the right turn maneuver by the car 402B. For example, the car 404 may proceed through the intersection 400B, as the car 404 can trust that the car 402B will turn at the intersection 400B. Accordingly, the present techniques enable the car 404 to proceed through the intersection sooner, without having to wait for the car 402B to fully complete the turning maneuver.

Figure 5:
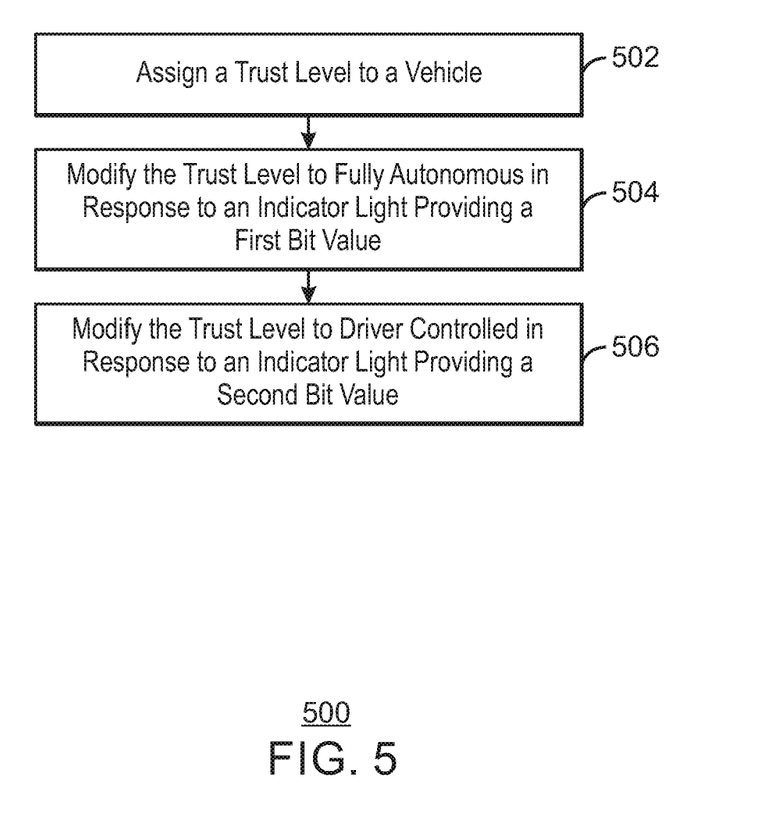
FIG. 5 is a process flow diagram of a method for communicating the autonomy status of vehicles.

FIG. 5 is a process flow diagram of a method 500 for communicating the autonomy status of vehicles. At block 502, a trust level may be assigned to a vehicle. In embodiments, an initial trust level is assigned to all vehicles in a field of view. At block 504, the trust level is modified to indicate a fully autonomous vehicle in response to an indicator light of the vehicle providing a first bit value. In embodiments, the trust level is modified to a high trust level. Additionally, in embodiments, the bit value provided may be based on a particular level of a driving system of the vehicle. For example, the first bit value may be provided when the driving system of the current vehicle is a level four or five driving system as described with respect to FIG. 1.

At block 506, the trust level is modified to indicate a driver controlled vehicle in response to an indicator light of the vehicle providing a second bit value. In embodiments, the trust level is modified to a low trust level. Additionally, in embodiments, the bit value provided may be based on a particular level of a driving system of the vehicle. For example, the second bit value may be provided when the driving system of the current vehicle is a level zero, one, two or three driving system as described with respect to FIG. 1.

Figure 6:
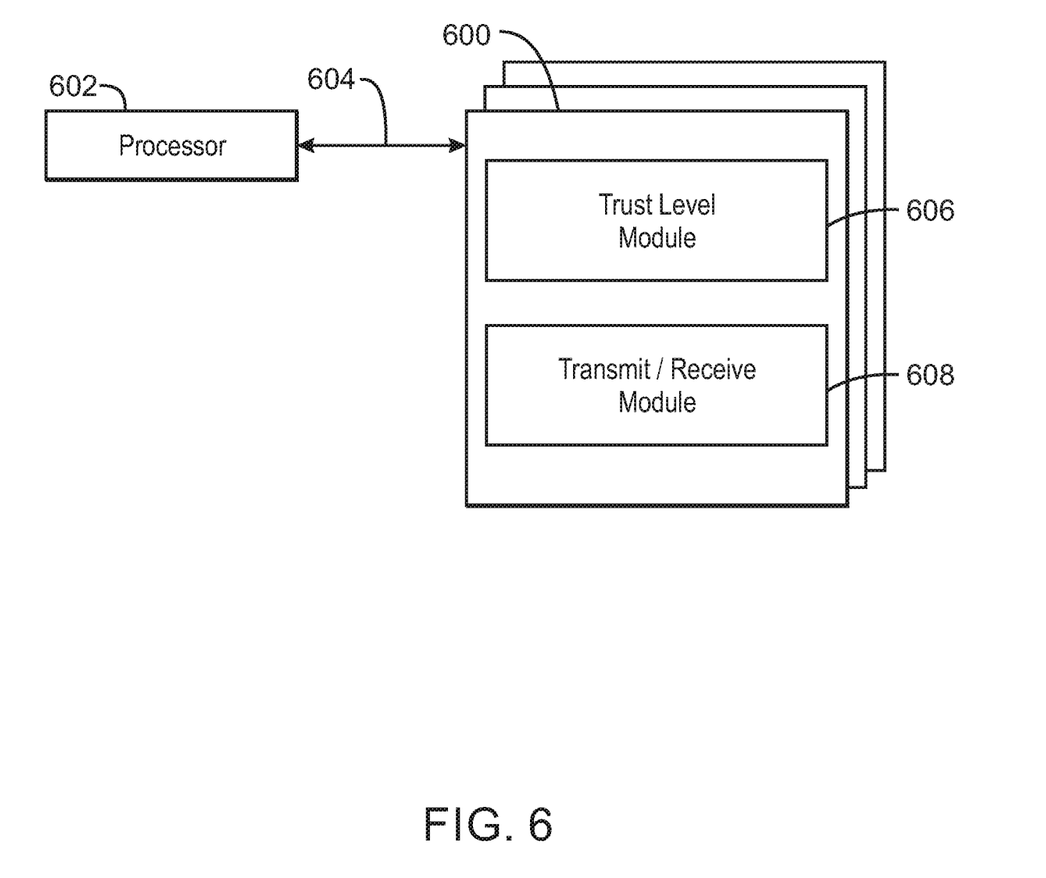
FIG. 6 is a block diagram showing a medium that contains logic for communicating the autonomy status of vehicles.

FIG. 6 is a block diagram showing a medium 600 that contains logic for communicating the autonomy status of vehicles. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The various software components discussed herein may be stored on the tangible, non-transitory computer-readable medium 600, as indicated in FIG. 6. The medium 600 may include modules 606-608 configured to perform the techniques described herein. For example, a trust level module 606 may be configured to derive a trust level of all vehicles in a field of view. In embodiments, the trust level is initially set to a lowest level. As each car in the field of view communicates a trust level, the trust level may be modified based on each vehicle's autonomy level. A transmit receive module 608 may be configured to transmit or receive a trust level based on an autonomy status of a car.

The block diagram of FIG. 6 is not intended to indicate that the tangible, non-transitory computer-readable medium 600 is to include all of the components shown in FIG. 6. Further, the tangible, non-transitory computer-readable medium 600 may include any number of additional components not shown in FIG. 6, depending on the details of the specific implementation.

It is to be understood that any suitable number of the software components shown in FIG. 6 may be included within the one or more tangible, non-transitory computer-readable media 600. Furthermore, any number of additional software components not shown in FIG. 6 may be included within the one or more tangible, non-transitory, computer-readable media 600, depending on the specific application.

Figure 7:
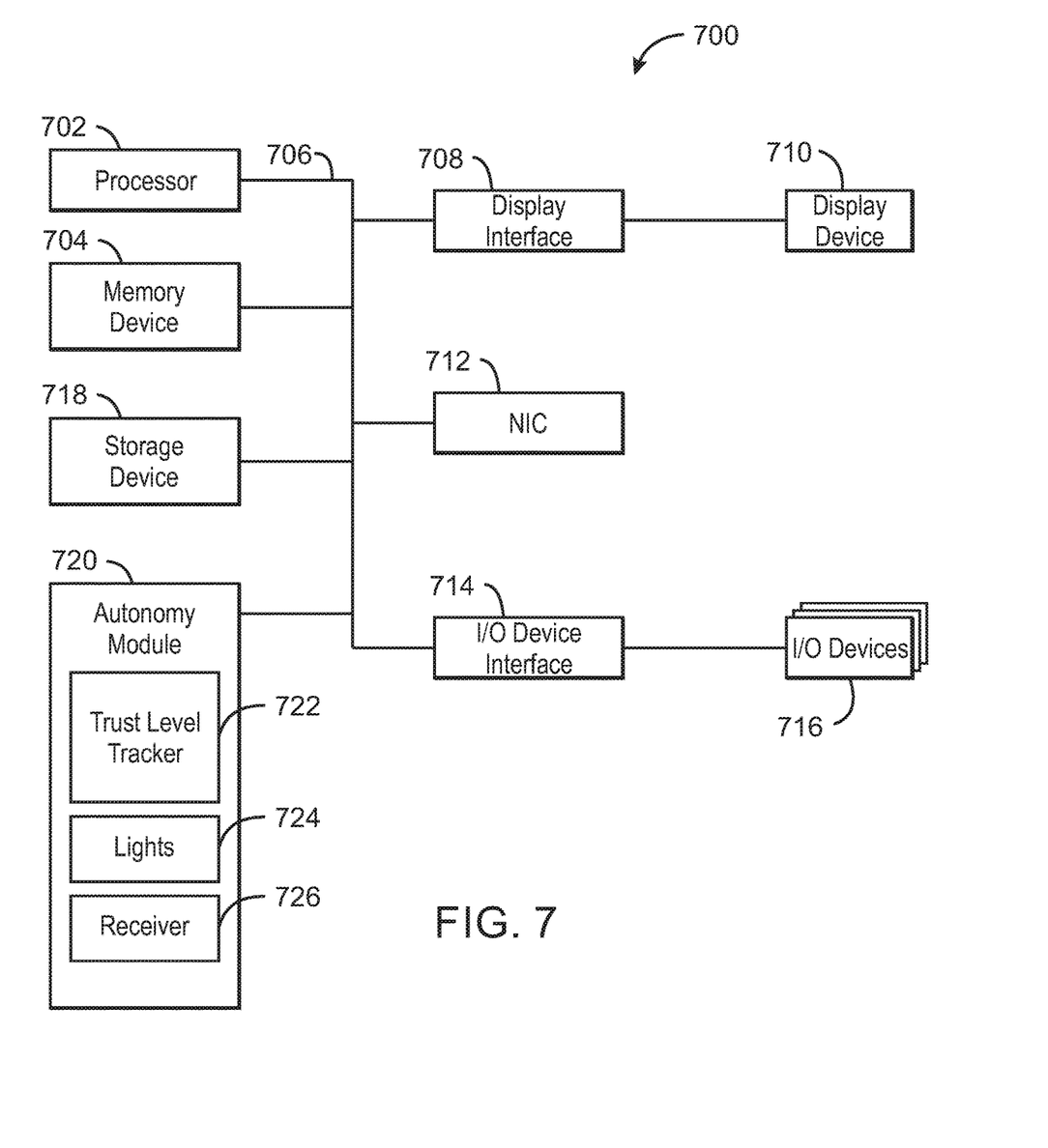
FIG. 7 is a block diagram of an example of a computing device that can communicate the autonomy status of vehicles.

FIG. 7 is a block diagram of an example of a computing device 700 that can communicate the autonomy status of vehicles. In some embodiments, computing device 700 is a component of an autonomous vehicle system. In some embodiments, a computing device can be included in a vehicle (for example, in a car, automobile, truck, and the like). In some embodiments, any portion of the methods and/or systems illustrated in any one or more of FIGS. 1-6, and any of the embodiments described herein can be included in and/or be implemented by computing device 700. The computing device 700 may be, for example, a mobile phone, mobile device, handset, laptop computer, desktop computer, or tablet computer, among others. The computing device 700 may include a processor 702 that is adapted to execute stored instructions, as well as a memory device 704 (and/or storage device 704) that stores instructions that are executable by the processor 702. The processor 702 can be a single core processor, a multi-core processor, a computing cluster, or any number of other configurations. For example, processor 702 can be an Intel® processor such as an Intel® Celeron, Pentium, Core, Core i3, Core i5, or Core i7 processor. In some embodiments, processor 702 can be an Intel® x86 based processor. In some embodiments, processor 702 can be an ARM based processor. The memory device 704 can be a memory device and/or a storage device, and can include volatile storage, non-volatile storage, random access memory, read only memory, flash memory, or any other suitable memory or storage systems. The instructions that are executed by the processor 702 may also be used to implement navigation routing as described in this specification.

The processor 702 may also be linked through the system interconnect 706 (e.g., PCI®, PCI-Express®, NuBus, etc.) to a display interface 708 adapted to connect the computing device 700 to a display device 710. The display device 710 may include a display screen that is a built-in component of the computing device 700. The display device 710 may also include a computer monitor, television, or projector, among others, that is externally connected to the computing device 700. The display device 710 can include light emitting diodes (LEDs), organic light emitting diodes (OLEDs), and/or micro-LEDs (µLEDs), among others.

In some embodiments, the display interface 708 can include any suitable graphics processing unit, transmitter, port, physical interconnect, and the like. In some examples, the display interface 708 can implement any suitable protocol for transmitting data to the display device 710. For example, the display interface 708 can transmit data using a high-definition multimedia interface (HDMI) protocol, a DisplayPort protocol, or some other wired or wireless protocol or communication link, and the like.

In addition, one or more network interface controllers (also referred to herein as a NIC) 712 may be adapted to connect the computing device 700 through the system interconnect 706 to one or more networks or devices (not depicted). The network (not depicted) may be a cellular network, a radio network, a wide area network (WAN), a local area network (LAN), or the Internet, among others. In some embodiments, one or more NIC 712 can include a wireless device to connect to a GPS network, and/or to one or more satellites (for example, one or more GPS satellites).

The processor 702 may be connected through system interconnect 706 to an input/output (I/O) device interface 714 adapted to connect the computing host device 700 to one or more I/O devices 716. The I/O devices 716 may include, for example, a keyboard and/or a pointing device, where the pointing device may include a touchpad or a touchscreen, among others. The I/O devices 716 may be built-in components of the computing device 700, or may be devices that are externally connected to the computing device 700. The I/O devices may also include image capture mechanisms to capture VLC as described above.

In some embodiments, the processor 702 may also be linked through the system interconnect 706 to a storage device 718 that can include a hard drive, a solid state drive (SSD), a magnetic drive, an optical drive, a USB flash drive, an array of drives, or any other type of storage, including combinations thereof. In some embodiments, the storage device 718 can include any suitable applications. In some embodiments, the storage device 718 can include a basic input/output system (BIOS).

The processor 702 may be connected through system interconnect 706 to an autonomy module 720. In embodiments, the autonomy module 720 is configured to operate a vehicle in autonomous mode. In embodiments, a trust level tracker 722 is configured to derive a trust level of all vehicles in a field of view. In embodiments, the trust level is initially set to a lowest level. As each car in the field of view communicates a trust level, the trust level may be modified based on each vehicle's autonomy level. The trust level tracker 722 may be configured to transmit a trust level based on an autonomy status of a car via a light of a vehicle. Thus, in embodiments, the trust level tracker 722 is communicatively coupled with a plurality of lights 724. Moreover, a receiver 726 may be configured to receive VLC data. In embodiments, the receiver may be any camera, image capture mechanism, infrared light receiver, and the like that can detect and receive VLC. Accordingly, the autonomy module 720 may be communicatively coupled with a camera, LIDAR, or any other device 726 that is to capture VLC.

It is to be understood that the block diagram of FIG. 7 is not intended to indicate that the computing device 700 is to include all of the components shown in FIG. 7. Rather, the computing device 700 can include fewer or additional components not illustrated in FIG. 7 (e.g., additional memory components, embedded controllers, additional modules, additional network interfaces, etc.) In some embodiments, databases and/or storage devices described herein can be coupled within computing device 700 (for example, as a storage device such as storage device 718, and/or can be connected to computing device 700, for example, using NIC 712). In some embodiments, sensors (such as vehicle sensors) can be coupled to the computing device 700 (for example, as one or more I/O devices 716). In some embodiments, sensors such as, for example, one or more rain sensors, vehicle sensors, cameras, audio sensors, steering wheel sensors, etc. can be included in computing device 700 (for example, as one or more I/O devices 716).

Example 1 is a system for visible light communications. The system includes an indicator light; a memory that is to store instructions and that is communicatively coupled to the display; and a processor communicatively coupled to the light source and the memory, wherein when the processor is to execute the instructions, the processor is to: assign a trust level to a vehicle, wherein the trust level is a lowest trust level; modify the trust level to fully autonomous in response to the indicator light providing a fully autonomous status prior to a maneuver as indicated by the indicator light; and modify the trust level to driver controlled in response to the indicator light providing a driver controlled status prior to the maneuver as indicated by the indicator light.

Example 2 includes the system of example 1, including or excluding optional features. In this example, the indicator light is to signal the maneuver to be perceived by humans and an autonomy status that is not perceived by humans.

Example 3 includes the system of any one of examples 1 to 2, including or excluding optional features. In this example, the trust level is modified based on an autonomy status of the vehicle.

Example 4 includes the system of any one of examples 1 to 3, including or excluding optional features. In this example, the trust level is modified based on a driving system level of the vehicle.

Example 5 includes the system of any one of examples 1 to 4, including or excluding optional features. In this example, the fully autonomous status and the driver controlled status correspond to bit values generated by the indicator light via visible light communications.

Example 6 includes the system of any one of examples 1 to 5, including or excluding optional features. In this example, the driver controlled status comprises a level zero, one, two or three driving system.

Example 7 includes the system of any one of examples 1 to 6, including or excluding optional features. In this example, the fully autonomous status comprises a level four or five driving system.

Example 8 includes the system of any one of examples 1 to 7, including or excluding optional features. In this example, the fully autonomous status and the driver controlled status are generated by the indicator light via visible light communications.

Example 9 includes the system of any one of examples 1 to 8, including or excluding optional features. In this example, the trust level is stored for vehicles in a field of view.

Example 10 includes the system of any one of examples 1 to 9, including or excluding optional features. In this example, the maneuver is a turn from a first street onto a second street.

Example 11 includes the system of any one of examples 1 to 10, including or excluding optional features. In this example, the maneuver is a lane change from a first lane to a second lane.

Example 12 includes the system of any one of examples 1 to 11, including or excluding optional features. In this example, the trust level remains a lowest trust level in response to the vehicle not providing the fully autonomous status or the driver controlled status.

Example 13 is a method. The method includes assigning a trust level to a vehicle, wherein the trust level is a lowest trust level; modifying the trust level to fully autonomous in response to an indicator light providing a fully autonomous status prior to a maneuver as indicated by the indicator light; and modifying the trust level to driver controlled in response to the indicator light providing a driver controlled status prior to the maneuver as indicated by the indicator light.

Example 14 includes the method of example 13, including or excluding optional features. In this example, the indicator light is to signal the maneuver to be perceived by humans and an autonomy status that is not perceived by humans.

Example 15 includes the method of any one of examples 13 to 14, including or excluding optional features. In this example, the trust level is modified based on an autonomy status of the vehicle.

Example 16 includes the method of any one of examples 13 to 15, including or excluding optional features. In this example, the trust level is modified based on a driving system level of the vehicle.

Example 17 includes the method of any one of examples 13 to 16, including or excluding optional features. In this example, the fully autonomous status and the driver controlled status correspond to bit values generated by the indicator light via visible light communications.

Example 18 includes the method of any one of examples 13 to 17, including or excluding optional features. In this example, the driver controlled status comprises a level zero, one, two or three driving system.

Example 19 includes the method of any one of examples 13 to 18, including or excluding optional features. In this example, the fully autonomous status comprises a level four or five driving system.

Example 20 includes the method of any one of examples 13 to 19, including or excluding optional features. In this example, the fully autonomous status and the driver controlled status are generated by the indicator light via pulse width communication.

Example 21 includes the method of any one of examples 13 to 20, including or excluding optional features. In this example, the trust level is stored for vehicles in a field of view.

Example 22 includes the method of any one of examples 13 to 21, including or excluding optional features. In this example, the maneuver is a turn from a first street onto a second street.

Example 23 includes the method of any one of examples 13 to 22, including or excluding optional features. In this example, the maneuver is a lane change from a first lane to a second lane.

Example 24 is an apparatus. The apparatus includes a trust level tracker to assign a trust level to a vehicle, wherein the trust level is a lowest trust level; the trust level tracker to modify the trust level to fully autonomous in response to an indicator light providing a fully autonomous status prior to a maneuver as indicated by the indicator light; and the trust level tracker to modify the trust level to driver controlled in response to the indicator light providing a driver controlled status prior to the maneuver as indicated by the indicator light.

Example 25 includes the apparatus of example 24, including or excluding optional features. In this example, the indicator light is to signal the maneuver to be perceived by humans and an autonomy status that is not perceived by humans.

Example 26 includes the apparatus of any one of examples 24 to 25, including or excluding optional features. In this example, the trust level is modified based on an autonomy status of the vehicle.

Example 27 includes the apparatus of any one of examples 24 to 26, including or excluding optional features. In this example, the trust level is modified based on a driving apparatus level of the vehicle.

Example 28 includes the apparatus of any one of examples 24 to 27, including or excluding optional features. In this example, the fully autonomous status and the driver controlled status correspond to bit values generated by the indicator light via visible light communications.

Example 29 includes the apparatus of any one of examples 24 to 28, including or excluding optional features. In this example, the driver controlled status comprises a level zero, one, two or three driving apparatus.

Example 30 includes the apparatus of any one of examples 24 to 29, including or excluding optional features. In this example, the fully autonomous status comprises a level four or five driving apparatus.

Example 31 includes the apparatus of any one of examples 24 to 30, including or excluding optional features. In this example, the fully autonomous status and the driver controlled status are generated by the indicator light via visible light communications.

Example 32 is at least one non-transitory machine readable medium having instructions stored therein that. The computer-readable medium includes instructions that direct the processor to assign a trust level to a vehicle, wherein the trust level is a lowest trust level; modify the trust level to fully autonomous in response to an indicator light providing a fully autonomous status prior to a maneuver as indicated by the indicator light; and modify the trust level to driver controlled in response to the indicator light providing a driver controlled status prior to the maneuver as indicated by the indicator light.

Example 33 includes the computer-readable medium of example 32, including or excluding optional features. In this example, the indicator light is to signal the maneuver to be perceived by humans and an autonomy status that is not perceived by humans.

Example 34 includes the computer-readable medium of any one of examples 32 to 33, including or excluding optional features. In this example, the trust level is modified based on an autonomy status of the vehicle.

Example 35 includes the computer-readable medium of any one of examples 32 to 34, including or excluding optional features. In this example, the trust level is modified based on a driving system level of the vehicle.

Example 36 includes the computer-readable medium of any one of examples 32 to 35, including or excluding optional features. In this example, the fully autonomous status and the driver controlled status correspond to bit values generated by the indicator light via visible light communications.

Example 37 includes the computer-readable medium of any one of examples 32 to 36, including or excluding optional features. In this example, the driver controlled status comprises a level zero, one, two or three driving system.

Example 38 includes the computer-readable medium of any one of examples 32 to 37, including or excluding optional features. In this example, the fully autonomous status comprises a level four or five driving system.

Example 39 includes the computer-readable medium of any one of examples 32 to 38, including or excluding optional features. In this example, the fully autonomous status and the driver controlled status are generated by the indicator light via pulse width communication.

Example 40 includes the computer-readable medium of any one of examples 32 to 39, including or excluding optional features. In this example, the trust level is stored for vehicles in a field of view.

Example 41 includes the computer-readable medium of any one of examples 32 to 40, including or excluding optional features. In this example, the maneuver is a turn from a first street onto a second street.

Example 42 includes the computer-readable medium of any one of examples 32 to 41, including or excluding optional features. In this example, the maneuver is a lane change from a first lane to a second lane.

Example 43 is an apparatus. The apparatus includes instructions that direct the processor to a means to assign a trust level to a vehicle, wherein the trust level is a lowest trust level; the means to assign the trust level to modify the trust level to fully autonomous in response to an indicator light providing a fully autonomous status prior to a maneuver as indicated by the indicator light; and the means to assign the trust level to modify the trust level to driver controlled in response to the indicator light providing a driver controlled status prior to the maneuver as indicated by the indicator light.

Example 44 includes the apparatus of example 43, including or excluding optional features. In this example, the indicator light is to signal the maneuver to be perceived by humans and an autonomy status that is not perceived by humans.

Example 45 includes the apparatus of any one of examples 43 to 44, including or excluding optional features. In this example, the trust level is modified based on an autonomy status of the vehicle.

Example 46 includes the apparatus of any one of examples 43 to 45, including or excluding optional features. In this example, the trust level is modified based on a driving apparatus level of the vehicle.

Example 47 includes the apparatus of any one of examples 43 to 46, including or excluding optional features. In this example, the fully autonomous status and the driver controlled status correspond to bit values generated by the indicator light via visible light communications.

Example 48 includes the apparatus of any one of examples 43 to 47, including or excluding optional features. In this example, the driver controlled status comprises a level zero, one, two or three driving apparatus.

Example 49 includes the apparatus of any one of examples 43 to 48, including or excluding optional features. In this example, the fully autonomous status comprises a level four or five driving apparatus.

Example 50 includes the apparatus of any one of examples 43 to 49, including or excluding optional features. In this example, the fully autonomous status and the driver controlled status are generated by the indicator light via visible light communications.

Reference in the specification to "one embodiment" or "an embodiment" or "some embodiments" of the disclosed subject matter means that a particular feature, structure, or characteristic described in connection with the embodiment is included in at least one embodiment of the disclosed subject matter. Thus, the phrase "in one embodiment" or "in some embodiments" may appear in various places throughout the specification, but the phrase may not necessarily refer to the same embodiment or embodiments.

Although an example embodiment of the disclosed subject matter is described with reference to the drawings, persons of ordinary skill in the art will readily appreciate that many other ways of implementing the disclosed subject matter may alternatively be used. For example, the order of execution of the blocks in flow diagrams may be changed, and/or some of the blocks in block/flow diagrams described may be changed, eliminated, or combined. Additionally, some of the circuit and/or block elements may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter. For example, in each illustrated embodiment and each described embodiment, it is to be understood that the diagrams of the figures and the description herein is not intended to indicate that the illustrated or described devices include all of the components shown in a particular figure or described in reference to a particular figure. In addition, each element may be implemented with logic, wherein the logic, as referred to herein, can include any suitable hardware (e.g., a processor, among others), software (e.g., an application, among others), firmware, or any suitable combination of hardware, software, and firmware, for example.

What is claimed is:

1. A system for visible light communications, comprising:
    a receiver to receive an indicator light with encoded visible light communication (VLC) data;
    a memory that is to store instructions and that is communicatively coupled to the display; and
    a processor communicatively coupled to the light source and the memory, wherein when the processor is to execute the instructions, the processor is to:
        assign a trust level to a vehicle, wherein the trust level is a lowest trust level and is modified based on an autonomy status received in the encoded visible light communication data;
        modify the trust level to fully autonomous in response to the indicator light providing a fully autonomous status prior to a maneuver as indicated by the indicator light; and
        modify the trust level to driver controlled in response to the indicator light providing a driver controlled status prior to the maneuver as indicated by the indicator light.

2. The system of claim 1, wherein the indicator light is to signal the maneuver to be perceived by humans and the autonomy status that is not perceived by humans.

3. The system of claim 1, wherein the trust level is modified based on a driving system level of the vehicle.

4. The system of claim 1, wherein the fully autonomous status and the driver controlled status correspond to bit values generated by the indicator light via visible light communications.

5. The system of claim 1, wherein the driver controlled status comprises a level zero, one, two or three driving system.

6. The system of claim 1, wherein the fully autonomous status comprises a level four or five driving system.

7. The system of claim 1, wherein the fully autonomous status and the driver controlled status are generated by the indicator light via visible light communications.

8. The system of claim 1, wherein the trust level is stored for vehicles in a field of view.

9. The system of claim 1, wherein the maneuver is a turn from a first street onto a second street.

10. The system of claim 1, wherein the maneuver is a lane change from a first lane to a second lane.

11. The system of claim 1, wherein the trust level remains a lowest trust level in response to the vehicle not providing the fully autonomous status or the driver controlled status.

12. A method, comprising:
    assigning a trust level to a vehicle, wherein the trust level is a lowest trust level that is modified based on received encoded visible light communication data from an indicator light;
    modifying the trust level to fully autonomous in response to the indicator light providing a fully autonomous status prior to a maneuver as indicated by the indicator light; and
    modifying the trust level to driver controlled in response to the indicator light providing a driver controlled status prior to the maneuver as indicated by the indicator light.

13. The method of claim 12, wherein the indicator light is to signal the maneuver to be perceived by humans and an autonomy status that is not perceived by humans.

14. The method of claim 12, wherein the trust level is modified based on an autonomy status of the vehicle.

15. The method of claim 12, wherein the trust level is modified based on a driving system level of the vehicle.

16. The method of claim 12, wherein the fully autonomous status and the driver controlled status correspond to bit values generated by the indicator light via visible light communications.

17. The method of claim 12, wherein the driver controlled status comprises a level zero, one, two or three driving system.

18. An apparatus, comprising:
    a trust level tracker to assign a trust level to a vehicle, wherein the trust level is a lowest trust level that is modified based on received encoded visible light communication data from an indicator light;
    the trust level tracker to modify the trust level to fully autonomous in response to the indicator light providing a fully autonomous status prior to a maneuver as indicated by the indicator light; and
    the trust level tracker to modify the trust level to driver controlled in response to the indicator light providing a driver controlled status prior to the maneuver as indicated by the indicator light.

19. The apparatus of claim 18, wherein the indicator light is to signal the maneuver to be perceived by humans and an autonomy status that is not perceived by humans.

20. The apparatus of claim 18, wherein the trust level is modified based on an autonomy status of the vehicle.

21. The apparatus of claim 18, wherein the trust level is modified based on a driving apparatus level of the vehicle.

22. The apparatus of claim 18, wherein the fully autonomous status and the driver controlled status correspond to bit values generated by the indicator light via visible light communications.

23. The apparatus of claim 18, wherein the driver controlled status comprises a level zero, one, two or three driving apparatus.

24. The apparatus of claim 18, wherein the fully autonomous status comprises a level four or five driving apparatus.

* * * * *